Figure 3:
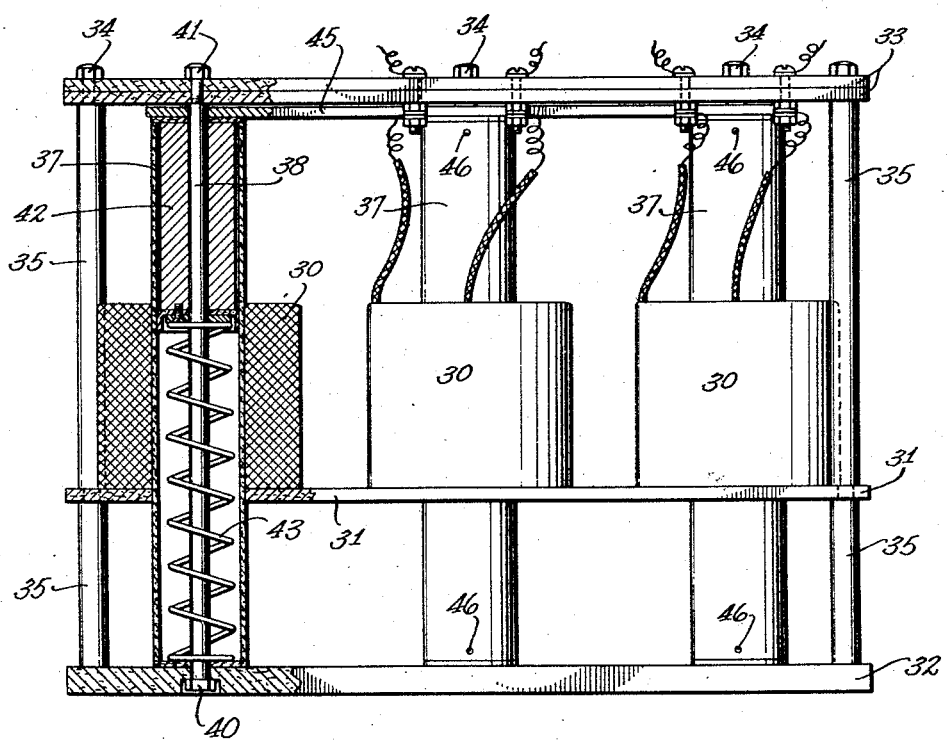

July 1, 1941. J. L. FIELDS 2,247,655
VOLTAGE CONTROL FOR SYNCHRONOUS MOTORS
Filed June 26, 1937 2 Sheets-Sheet 1
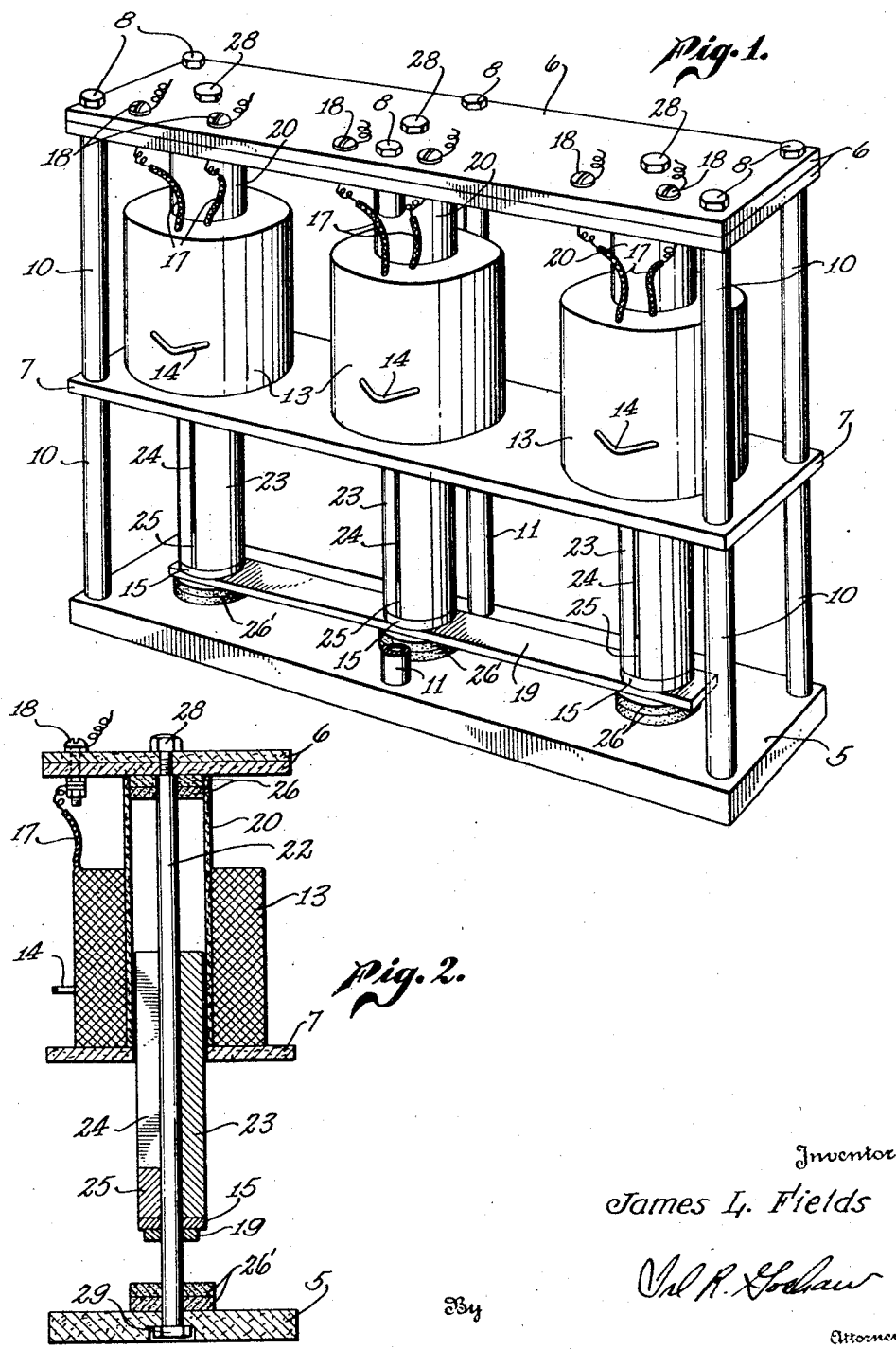
Inventor
James L. Fields
By
Attorney July 1, 1941.   J. L. FIELDS   2,247,655
VOLTAGE CONTROL FOR SYNCHRONOUS MOTORS
Filed June 26, 1937   2 Sheets-Sheet 2

Inventor
James L. Fields
By Ird R. Gorham
Attorney

Patented July 1, 1941

2,247,655

UNITED STATES PATENT OFFICE 2,247,655

VOLTAGE CONTROL FOR SYNCHRONOUS MOTORS

James L. Fields, Los Angeles, Calif., assignor to Radio Corporation of America, a corporation of Delaware Application June 26, 1937, Serial No. 150,562

3 Claims. (Cl. 171—242)

This invention relates to a method of and means for regulating voltages and particularly to the regulation of starting voltages for synchronous electric motors.

In the motion picture industry, synchronous motors are employed as the prime movers for cameras, recorders, projectors or other mechanisms which are to be operated at a predetermined constant speed. When such a motor directly drives a film mechanism, acceleration should not be too rapid, otherwise the film will form loops between certain sprockets and rollers, which is particularly undesirable. Also, a jerky or uneven starting action may also cause these loops as well as damage to the film perforations. In interlock systems where a synchronous motor is employed to drive the master motor distributor, jerky and too rapid acceleration may throw the entire system out of synchronism. The principal object of the present invention, therefore, is to start a synchronous motor with a desired uniform acceleration.

Another object of the invention is to automatically control the voltage upon a synchronous motor in accordance with its starting current.

A further object of the invention is to control the impressed voltage on a synchronous motor during its starting period.

A still further object of the invention is to control the operation of the voltage-varying device by the use of gravity or mechanical tension.

It is well known that a synchronous motor draws, during starting or acceleration, a large current compared to its normal operating current, this large current being caused by the low back E. M. F. developed during starting. When the motor has once reached its normal speed, determined by the number and arrangement of poles and the frequency of the current, the current drawn by the motor reduces to a comparatively small value. If the voltage is reduced during the acceleration period, the motor will still come up to synchronous speed but will draw less current over the starting period and start more uniformly and more slowly. The present invention controls the starting voltage upon the motor to the extent that the large initial current automatically produces substantially instantaneous operation of a voltage-reducing device in the supply lines which continues to be effective until the current drops to a predetermined value, at which time the full voltage is applied to enable the motor to operate under its normal load. The starting control, therefore, is constructed to operate at certain current values which, in turn, are determined by the starting characteristic of the motor.

The reactance unit, in brief, contemplates the use of magnetism operating upon magnetic material against gravity or against tension of a spring. That is, a current in a solenoid or inductance coil of or above a certain predetermined value produces a magnetic field sufficient to overcome gravity, determined by the weight of the magnetic material, or spring tension, determined by the size of the spring. With such a field, the magnetic material is drawn into the solenoid, increasing its impedance and the voltage drop across it, thus reducing the voltage impressed upon the motor or other load. When the current falls to or below this predetermined value, thus reducing the field, gravity or spring action overcomes the reduced magnetism and the core is then removed from the solenoid, thus reducing the impedance and permitting the normal voltage to be impressed upon the motor.

Figure 4:
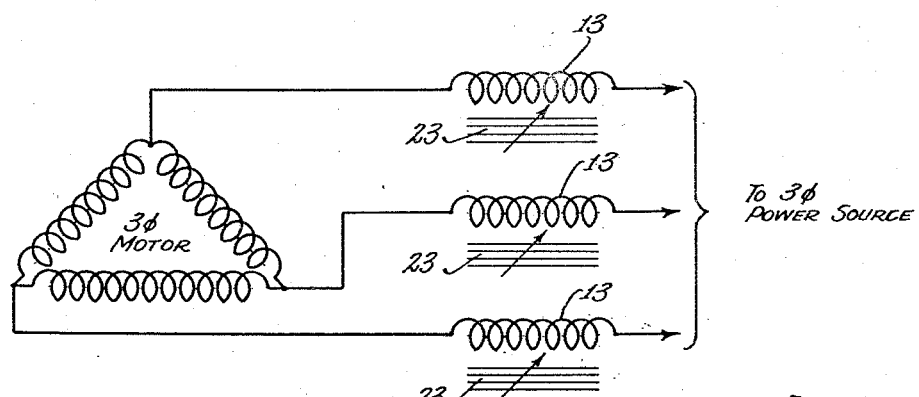

The details of the invention will be more fully understood by referring to the accompanying drawings, in which:

Figure 1 is a perspective view of one embodiment of the reactor unit for a three-phase system, Figure 2 is a cross-sectional view of an element of the unit of Fig. 1, Figure 3 is an elevational view of another embodiment of a three-phase unit, one element of which is shown in cross-section, and Figure 4 is a schematic circuit diagram of the method of connecting the reactor units of Figs. 1 and 3 in a three-phase synchronous motor circuit.

Referring specifically to Fig. 1, the framework comprises a base plate 5, top plates 6, which may also be composed of one plate, and an intermediate shelf 7, these elements being composed of Bakelite or like insulating material. A plurality of bolts, the heads of which are shown at 8, extend from the lower plate 5 to the upper plates 6, and have mounted thereon cylindrical spacers 10, the perspective cross-section of which is shown at 11, where the center front bolt and spacers have been broken away for better illustration. In the present unit there are six bolts and twelve spacers, the upper and lower spacers being of approximately the same length.

Supported by shelf 7 are three solenoids or reactor coils 13 having one turn of each exposed as at 14 for varying the number of effective turns of the coils. That is, for heavier current loads less turns are required to obtain the same magnetic field, and with tapped coils a single design may be employed for different motors. Leads 17 extend from the coils 13 to binding posts 18 mounted on the top plates 6.

Extending between the top plates 6 and shelf 7 are cylinders 20, of Bakelite or other insulating material, around which the coils 13 are mounted (see Fig. 2). Rods 22 extend from the upper plates 6 to the base plate 5 and are held in position by stud bolts 28 and 29. Within the cylinders 20 and around rods 22 are magnetic cores 23, these cores being split longitudinally as shown at 24 to reduce eddy current losses. The two ends are held separated approximately 1/64 of an inch by non-magnetic spacers 25. At the upper end of the cylinder 20 and surrounding rods 22 are positioned one or more soft felt or sponge rubber bumper washers 26 for absorbing the shock of the cores 23 when drawn upwardly by the fields produced by the coils 13. A pair of similar washers 26' are positioned around the rods 22 at their lower ends to absorb the shock when the cores return to their normal positions. Although unnecessary for satisfactory operation under a balanced condition, it has been found desirable to strap the three cores 23 together by a bar 19 to insure simultaneous operation under all conditions. Spacers 15 are employed for placing the cores at an optimum position.

Referring now to Fig. 4, the coils 13 are shown schematically with variable cores at 23. One set of terminals of the coils 13 is adapted to be connected to a three-phase power source and the opposite terminals to the windings of a three-phase synchronous motor shown connected in delta.

In operating the system so far described, a power switch is thrown and substantially normal load voltage is applied to the motor through the windings 13 as the cores 23 are practically without the magnetic field. Immediately a large current is drawn through the coils 13, producing sufficient magnetic field to instantly attract the cores 23 into the center of the coils 13. The insertion of the cores within the magnetic field increases the impedance or reactance of the coils, thus reducing the voltage upon the motor. The motor then continues to accelerate toward its normal synchronous speed, the back E. M. F. uniformly increasing, thus uniformly decreasing the current through the solenoids. When synchronous speed is reached, the current has decreased to a value at which the field produced thereby is insufficient to maintain the cores within the solenoid openings. When the cores are fully out, full running voltage is then applied to the motor. The present units are designed so that the current drawn at or the instant before normal running current is reached is the predetermined value. For instance, for a 1/3 horse-power motor the design was such that the cores started out at 4.75 amperes and the normal running current was 4 amperes. The voltage impressed on the motor, therefore, was increased uniformly from the time the cores reached their internal positions to the time they reached their normal external positions. That is, the voltage increases while the cores are in as the motor speeds up, and continues to increase as the cores are withdrawn, the design providing no abrupt change or variation in the rate of change in the voltage or current starting characteristic.

It has been found in practice that a voltage drop of from 40 to 45% across the coils with the cores in is satisfactory to provide a very smooth acceleration, and the solenoids and cores have been designed to produce substantially this drop in voltage. A voltage drop of 3% is permissible with the cores out.

To be specific, coils 6 inches long wound with approximately 235 turns of #9 copper wire were found to provide satisfactory operation for a 3-horse-power motor operating from a 60-cycle, 3-phase, 230-volt power source. The cores for these coils had a diameter of $1\frac{1}{16}$ inches and were 6 inches long. For a 1/3-horse-power motor operating on a 50-cycle, 3-phase, 230-volt supply, the reactor unit had coils with 475 turns of #14 copper wire and were 4 inches long. The cores for these latter coils were $1\frac{1}{16}$ inches in diameter and approximately 4 inches long. These units provided particularly uniform starting with freedom from irregularity.

Referring now to Fig. 3, showing a second embodiment of the invention, three coils 30 are mounted upon a shelf 31 of a rack having a base plate 32 and top plates 33. The construction of the rods 34 and spacers 35 is the same as in the modification of Fig. 1. In the modification of Fig. 3, however, the Bakelite or other insulating cylinders 37 extend from the top plates 33 to the base plate 32, and have positioned therein rods 38, attached by bolts 40 and 41, and upon which are magnetic cores 42 and compression springs 43. A tie strap 45 connects the cores together so that they all move upwardly or downwardly simultaneously. There are also provided airholes 46 in the cylinders 37 to permit the air to be expelled when the cores are pushed upwardly by the springs 43 or pulled downwardly by the fields of the coils 30.

This modification operates in identically the same manner as the unit of Fig. 1 except that the reactive or restoring force of the cores to their normal position is by spring action instead of by gravity. That is, starting when the current is large enough to produce sufficient field strength to pull the cores within the solenoids 30, the cores compress the springs 43, while upon a decrease in current to a predetermined point, the springs operate to remove the cores from the coils and permit the impedances thereof to decrease in the same manner as Fig. 1.

There have been described above two modifications of an automatic reactor unit which may be placed in a synchronous motor circuit to permit uniform acceleration at a predetermined rate. It is to be understood, however, that although the invention has been disclosed as a starting control for synchronous motors, it is adapted to control the voltage on any load having a characteristic similar to a synchronous motor. It is also to be understood that the device may be used in a single-phase system, in which case one or more solenoids may be employed.

I claim as my invention:

1. A reactance unit comprising a solenoid having a vertically disposed opening therein, a rack having upper and lower cross members, means intermediate said cross members for supporting said solenoid, a cylindrical casing in said opening in said solenoid, a centrally disposed rod in said casing, and a magnetic core surrounding said rod and normally disposed externally of said casing, said core being adapted to be rapidly drawn within said casing, said upper cross member limiting the movement of said core in a position within said casing providing the greatest reactance to currents through said solenoid, and said lower cross member limiting the movement of said core in its position externally of said casing.

2. A variable reactance unit comprising a solenoid having a vertically disposed opening therein, a cylindrical casing within said opening, means for supporting said solenoid and said casing, a rod centrally disposed within said opening, means for mounting said rod at the ends thereof, a magnetic core surrounding said rod and adapted to be moved into and out of said cylindrical casing in said solenoid, said core being adapted to be rapidly drawn within said solenoid and adapted to be withdrawn from said solenoid by gravity, and means adjacent the ends of said rod for cushioning said core when abruptly stopped within said solenoid and abruptly stopped at its normal position externally of said solenoid, the normal position of said core being outside of said cylindrical casing.

3. A reactance unit structure comprising a rack having vertical upright members and upper and lower cross members, an intermediate shelf member substantially midway between said upper and lower cross members, a plurality of cylindrical members interposed between said shelf and upper cross member, a plurality of solenoids each surrounding one of said cylindrical members and supported by said shelf member, rods adapted to connect said upper and lower cross members and centrally disposed within said cylindrical members, and a plurality of magnetic core elements adapted to be moved upwardly at a rapid rate along said rods to positions within said cylindrical members providing the greatest reactance to currents flowing through said solenoids, said cores being drawn within said solenoids by the magnetic fields produced by current flowing in said solenoids, said cores being adapted to be withdrawn from said solenoids by gravity after the currents in said solenoids have reached predetermined values.

JAMES L. FIELDS.